United States Patent
Lorenz et al.

(10) Patent No.: US 9,110,807 B2
(45) Date of Patent: Aug. 18, 2015

(54) CACHE CONFLICT DETECTION

(75) Inventors: Brian Keith Lorenz, Littleton, CO (US); Johannes Alberti, San Ramon, CA (US); Lance Waterman, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 177 days.

(21) Appl. No.: 13/478,181

(22) Filed: May 23, 2012

(65) Prior Publication Data

US 2013/0318055 A1    Nov. 28, 2013

(51) Int. Cl.
*G06F 17/00* (2006.01)
*G06F 12/08* (2006.01)

(52) U.S. Cl.
CPC ........ *G06F 12/0804* (2013.01); *G06F 12/0811* (2013.01); *G06F 12/0815* (2013.01); *G06F 12/0868* (2013.01); *G06F 2212/1032* (2013.01)

(58) Field of Classification Search
CPC ............ G06F 12/0804; G06F 12/0811; G06F 12/0815; G06F 12/0868; G06F 12/01032
USPC .......................... 707/609, 610, 623, 687, 695
See application file for complete search history.

(56) References Cited

U.S. PATENT DOCUMENTS

| | | | |
|---|---|---|---|
| 6,292,835 B1 | 9/2001 | Huang et al. | |
| 6,381,241 B1 | 4/2002 | Ghirnikar et al. | |
| 6,983,293 B2 | 1/2006 | Wang | |
| 7,103,617 B2 * | 9/2006 | Phatak | 707/999.221 |
| 7,130,871 B2 | 10/2006 | Acree et al. | |
| 7,467,389 B2 | 12/2008 | Mukkamala et al. | |
| 7,512,638 B2 | 3/2009 | Jhaveri et al. | |
| 7,539,778 B2 | 5/2009 | Hansmann et al. | |
| 7,606,838 B2 | 10/2009 | Tobies | |
| 7,620,659 B2 | 11/2009 | Novik et al. | |
| 7,660,830 B2 | 2/2010 | Ordille | |
| 7,676,573 B2 | 3/2010 | Herzog et al. | |
| 7,747,567 B2 | 6/2010 | Teegan et al. | |
| 7,778,962 B2 | 8/2010 | Shah et al. | |
| 7,805,420 B2 | 9/2010 | Kapoor et al. | |
| 7,814,483 B2 | 10/2010 | Li et al. | |
| 7,853,561 B2 | 12/2010 | Holenstein et al. | |
| 7,882,062 B2 | 2/2011 | Holenstein et al. | |

(Continued)

FOREIGN PATENT DOCUMENTS

| | | |
|---|---|---|
| KR | 2003/0072693 A | 9/2003 |
| KR | 2006/0060629 A | 6/2006 |
| KR | 2011/0074059 A | 6/2011 |

OTHER PUBLICATIONS

Office Communication, dated Jan. 2, 2013, for U.S. Appl. No. 12/503,573, filed Jul. 15, 2009, 19 pages.

(Continued)

*Primary Examiner* — Hares Jami
(74) *Attorney, Agent, or Firm* — Sterne, Kessler, Goldstein & Fox P.L.L.C.

(57) ABSTRACT

Methods, systems, and computer program products for cache conflict detection are provided. A computer-implemented method may include providing a partial graph of data to an application executing on a mobile device where the partial graph is derived from a document comprising a graph of data having a plurality of nodes, receiving a modified partial graph from the application where the modified partial graph includes one or more changes to the partial graph, and determining a document version used to derive the partial graph is no longer a most recent version of the document.

20 Claims, 7 Drawing Sheets

(56) References Cited

U.S. PATENT DOCUMENTS

| | | | |
|---|---|---|---|
| 7,900,142 | B2 | 3/2011 | Baer |
| 7,962,458 | B2 | 6/2011 | Holenstein et al. |
| 8,023,934 | B2 | 9/2011 | Jeide et al. |
| 8,037,056 | B2 | 10/2011 | Naicken et al. |
| 8,046,424 | B2 | 10/2011 | Novik et al. |
| 8,086,661 | B2 | 12/2011 | Holenstein et al. |
| 8,131,670 | B2 | 3/2012 | i Dalfo et al. |
| 8,166,101 | B2 | 4/2012 | Shah |
| 8,200,246 | B2 | 6/2012 | Khosravy et al. |
| 8,218,549 | B2 | 7/2012 | Dekel et al. |
| 8,238,696 | B2 | 8/2012 | Dart et al. |
| 8,478,789 | B2 | 7/2013 | O'Farrell et al. |
| 8,527,609 | B2 | 9/2013 | Huang et al. |
| 8,751,464 | B1* | 6/2014 | Weiss et al. ............... 707/695 |
| 2003/0110085 | A1 | 6/2003 | Murren et al. |
| 2003/0182450 | A1* | 9/2003 | Ong et al. ............... 709/246 |
| 2004/0001498 | A1 | 1/2004 | Chen et al. |
| 2004/0133599 | A1 | 7/2004 | Warren et al. |
| 2004/0133644 | A1 | 7/2004 | Warren et al. |
| 2004/0148420 | A1 | 7/2004 | Hinshaw et al. |
| 2004/0205770 | A1 | 10/2004 | Zhang et al. |
| 2005/0021354 | A1 | 1/2005 | Brendle et al. |
| 2005/0055465 | A1 | 3/2005 | Sato |
| 2005/0055698 | A1 | 3/2005 | Sasaki et al. |
| 2005/0268032 | A1 | 12/2005 | Sikdar et al. |
| 2006/0112398 | A1 | 5/2006 | Mukkamala et al. |
| 2006/0123010 | A1 | 6/2006 | Landry et al. |
| 2007/0073808 | A1 | 3/2007 | Berrey et al. |
| 2007/0099640 | A1 | 5/2007 | Khushu et al. |
| 2007/0100834 | A1 | 5/2007 | Landry et al. |
| 2007/0239725 | A1 | 10/2007 | Bhat et al. |
| 2007/0260475 | A1 | 11/2007 | Bhanote |
| 2007/0260628 | A1 | 11/2007 | Fuchs et al. |
| 2007/0271275 | A1 | 11/2007 | Fassette et al. |
| 2008/0104133 | A1 | 5/2008 | Chellappa et al. |
| 2008/0120304 | A1 | 5/2008 | Calio et al. |
| 2008/0155525 | A1 | 6/2008 | Ho |
| 2008/0176536 | A1 | 7/2008 | Galluzzo et al. |
| 2009/0036102 | A1 | 2/2009 | Ho |
| 2009/0037395 | A1 | 2/2009 | Ireland et al. |
| 2009/0037430 | A1 | 2/2009 | Mukkamala et al. |
| 2009/0059512 | A1 | 3/2009 | Lydon et al. |
| 2009/0171679 | A1 | 7/2009 | Salgado et al. |
| 2009/0177800 | A1 | 7/2009 | Gidron et al. |
| 2009/0187622 | A1 | 7/2009 | Xie |
| 2009/0198722 | A1 | 8/2009 | Hanson et al. |
| 2009/0222402 | A1 | 9/2009 | Tysowski |
| 2009/0247134 | A1 | 10/2009 | Jeide et al. |
| 2009/0254601 | A1 | 10/2009 | Moeller et al. |
| 2009/0307284 | A1 | 12/2009 | Welingkar et al. |
| 2010/0011075 | A1 | 1/2010 | Klassen et al. |
| 2010/0030783 | A1 | 2/2010 | Ho et al. |
| 2010/0169451 | A1 | 7/2010 | Barry |
| 2010/0205638 | A1 | 8/2010 | Ke |
| 2011/0154315 | A1 | 6/2011 | Singh et al. |
| 2011/0161290 | A1 | 6/2011 | Waterman et al. |
| 2011/0161339 | A1 | 6/2011 | Ireland et al. |
| 2011/0161349 | A1 | 6/2011 | Ireland et al. |
| 2011/0161383 | A1 | 6/2011 | Ho et al. |
| 2012/0158795 | A1 | 6/2012 | Ireland |
| 2012/0158828 | A1 | 6/2012 | Ireland et al. |
| 2012/0166446 | A1 | 6/2012 | Bowman et al. |
| 2013/0218845 | A1* | 8/2013 | Kleppner et al. ............... 707/687 |
| 2013/0318192 | A1 | 11/2013 | Lorenz et al. |

OTHER PUBLICATIONS

Aboulnaga, A., and Aref, W. G., "Window Query Processing in Linear Quadtrees," in *Distributed and Parallel Databases*, vol. 10, pp. 111-126 (2001).

Aref, W. G. and Samet, H., "Efficient Window Block Retrieval in Quadtree-Based Spatial Databases," in *GeoInformatica*, vol. 1, Chapter 1, pp. 59-91 (Apr. 1997).

Aref, W. G. and Samet, H., "Estimating Selectivity Factors of Spatial Operations," in *Foundations of Models and Languages for Data and Objects*, A. Heuer, & M. H. Scholl edition, pp. 31-43 (Aug. 14, 1993).

Fang, Y. et al., "Spatial Indexing in Microsoft SQL Server 2008," in *Proceedings of the 2008 ACM SIGMOD International Conference on Arrangement of Data*, ACM, New York, NY, pp. 1207-1215 (2008).

Gargantini, I., "An Effective Way to Represent Quadtrees," in *Communications of the ACM*, vol. 25, No. 12, ACM, New York, NY, pp. 905-910 (Dec. 1982).

Kothuri, R. K. V. et al., "Quadtree and R-Tree Indexes in Oracle Spatial: A Comparison Using GIS Data," in *Proceedings of the 2002 ACM SIGMOD International Conference on Management of Data*, ACM, New York, NY, pp. 546-557 (2002).

Kriegel, H.-P. et al., "Statistic Driven Acceleration of Object-Relational Space-Partitioning Index Structures," in *Database Systems for Advances Applications*, 14 pages, Jeju Island, Korea, Springer (2004).

Linthicum, David S., "Database-Oriented Middleware and EAI," in *Enterprise Application Intergration*, Chapter 11, Addison Wesley, pp. 191-208 (May 1, 2000).

Linthicum, David S., "EAI Moving Forward," in *Enterprise Application Intergration*, Chapter 20, Addison Wesley, pp. 339-349 (May 1, 2000).

Orenstein, J. A., "Redundancy in Spatial Databases," in *Proceedings of the 1989 ACM SIGMOD International Conference on Management of DATA*, ACM, New York, NY, pp. 294-305 (1989).

Samet, H., *Foundations of Multidimensional and Metric Data Structures*, Morgan Kaufmann, pp. 28-48, 191-193, 204-205, and 211-220 (2006).

Sinitsyn, A., "A Synchronization Framework for Personal Mobile Servers," *Proceedings of the IEEE Annual Conference on Pervasive Computing and Communications*, pp. 1-5, Mar. 14-17, 2004.

English Language Abstract for Korean Patent Publication No. 2003/0072693 A, published Sep. 19, 2003, European Patent Office, Espacenet Database, http://worldwide.espacenet.com, 1 page (listed as document FP1on the accompanying form PTO/SB/08a).

English Language Abstract for Korean Patent Publication No. 2006/0060629 A, published Jun. 5, 2006, European Patent Office, Espacenet Database, http://worldwide.espacenet.com, 1 page (listed as document FP2on the accompanying form PTO/SB/08a).

English Language Abstract for Korean Patent Publication No. 2011/0074059 A, published Jun. 30, 2011, European Patent Office, Espacenet Database, http://worldwide.espacenet.com, 1 page (listed as document FP3on the accompanying form PTO/SB/08a).

Extended European Search Report for European Patent Application No. PCT/US2009/004343, dated Sep. 27, 2011, 6 pages.

International Search Report and Written Opinion for International Application No. PCT/US2009/004343, dated Mar. 18, 2010, 11 pages.

International Search Report and Written Opinion for International Application No. PCT/US2010/060290, dated Jul. 28, 2011, 10 pages.

International Search Report and Written Opinion for International Application No. PCT/US2010/060293, dated Aug. 2, 2011, 11 pages.

International Search Report and Written Opinion for International Application No. PCT/US2010/060296, dated Aug. 5, 2011, 9 pages.

International Search Report and Written Opinion for International Application No. PCT/US2011/065297, dated May 29, 2012, 9 pages.

Office Action mailed Apr. 25, 2012 in U.S. Appl. No. 12/503,573, Ho et al., filed Jul. 15, 2009, 14 pages.

Office Action mailed Sep. 19, 2011 in U.S. Appl. No. 12/503,573, Ho et al., filed Jul. 15, 2009, 13 pages.

Office Action mailed Jul. 3, 2012 in U.S. Appl. No. 12/760,233, Waterman et al., filed Apr. 14, 2010, 9 pages.

Office Action mailed Apr. 11, 2012 in U.S. Appl. No. 12/813,104, Ireland et al., filed Jun. 10, 2010, 16 pages.

Office Action mailed Aug. 10, 2012 in U.S. Appl. No. 12/649,527, Ho et al., filed Dec. 30, 2009, 12 pages.

Office Action, mailed Mar. 7, 2012 in U.S. Appl. No. 12/797,975, Ireland et al., filed Jun. 10, 2010, 8 pages.

Office Action, mailed Jun. 27, 2012 in U.S. Appl. No. 12/797,975, Ireland et al., filed Jun. 10, 2010, 9 pages.

U.S. Appl. No. 13/478,185, Lorenz et al., filed May 23, 2012, entitled "Composite Graph Cache Management".

(56) References Cited

OTHER PUBLICATIONS

Office Communication, dated Sep. 25, 2012, for U.S. Appl. No. 12/813,104, filed Jun. 10, 2010, 14 pages.
Office Communication, dated Aug. 27, 2012, for U.S. Appl. No. 13/286,372, filed Nov. 1, 2011, 12 pages.
Extended European Search Report, dated Sep. 27, 2011, for European Patent Appl. No. 09803252.7, 6 pages.
Office Action mailed Nov. 20, 2012 in U.S. Appl. No. 12/760,233, Watermann et al., filed Apr. 14, 2010, 15 pages.
Office Action mailed May 2, 2013 in U.S. Appl. No. 12/760,233, Waterman et al., filed Apr. 14, 2010, 12 pages.
Final Office Action mailed Jun. 10, 2013 in U.S. Appl. No. 12/503,573, Ho et al., filed Jul. 15, 2009, 14 pages.
Non-Final Office Action mailed Oct. 1, 2013 in U.S. Appl. No. 12/503,573, Ho et al., filed Jul. 15, 2009, 13 pages.
Final Office Action mailed May 21, 2014 in U.S. Appl. No. 12/503,573, Ho et al., filed Jul. 15, 2009, 15 pages.
Non-Final Office Action mailed Sep. 23, 2013 in U.S Appl. No. 12/760,233, Waterman et al., filed Apr. 14, 2010, 10 pages.
Notice of Allowance mailed Mar. 10, 2014 in U.S. Appl. No. 12/760,233, Waterman, et al., filed Apr. 14, 2010, 8 pages.
Non-Final Office Action mailed Jan. 2, 2014 in U.S. Appl. No. 13/478,185, Lorenz, et al., filed May 23, 2012, 12 pages.
Notice of Allowance mailed May 20, 2014 in U.S. Appl. No. 13/478,185, Lorenz, et al., filed May 23, 2012, 18 pages.
Notification of Transmittal of the International Search Report and the Written Opinion for International Application No. PCT/US2013/042356, dated Sep. 6, 2013, 10 pages.

\* cited by examiner

CACHE CONFLICT DETECTION

BACKGROUND OF THE INVENTION

1. Field of the Invention

Embodiments generally relate to the field of mobility.

2. Background Art

Data owners are often concerned about shielding their data sources from unwanted or unexpected data requests. In particular, a data source that services a mobile application should not be exposed to an unpredictable amount of data requests from the mobile application.

Conventionally, mobile applications directly access data sources (e.g., enterprise data sources) to retrieve data. Because a plurality of mobile applications can make concurrent requests for data at different times, it often leads to an unexpected load on the data sources. Furthermore, because enterprise data typically exists in disparate formats at geographically distributed locations, servicing data requests received from the mobile applications can be a resource intensive process.

Accordingly, systems, methods and computer program products are needed that efficiently respond to mobile application data requests and maintain the consistency and validity of data while shielding data sources from being negatively impacted by such requests.

BRIEF SUMMARY OF THE INVENTION

Embodiments relate to cache conflict detection. In one embodiment, a computer-implemented method for cache conflict detection includes providing a partial graph of data to an application executing on a mobile device where the partial graph is derived from a document comprising a graph of data having a plurality of nodes, receiving a modified partial graph from the application where the modified partial graph includes one or more changes to the partial graph, and determining a document version used to derive the partial graph is no longer a most recent version of the document.

In another embodiment, a server-based system for cache conflict detection includes a caching module configured to provide a partial graph of data to an application executing on a mobile device where the partial graph is derived from a document comprising a graph of data having a plurality of nodes, receive a modified partial graph from the application where the modified partial graph includes one or more changes to the partial graph, and determine the document version used to derive the partial graph is no longer a most recent version of the document.

In an additional embodiment, a computer-readable storage device has control logic recorded thereon that when executed by a processor, causes the processor to perform cache conflict detection. The control logic includes computer-readable program code to cause the processor to provide a partial graph of data to an application executing on a mobile device where the partial graph is derived from a document comprising a graph of data having a plurality of nodes, receive a modified partial graph from the application where the modified partial graph includes one or more changes to the partial graph, and determine the document version used to derive the partial graph is no longer a most recent version of the document.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the embodiments and to enable a person skilled in the relevant art(s) to make and use the embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which embodiments of the invention would be of significant utility.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic with other embodiments whether or not explicitly described.

Various embodiments include methods, systems, and computer program products for detecting conflicts between cached data residing on a mobile device and more recently updated data in other systems. Embodiments may, for example, be incorporated as features in systems providing data caching for mobile devices and applications. An example system includes concurrently filed U.S. patent application Ser. No. 13/478,185, filed on May 23, 2012, entitled "Composite Graph Cache Management," which is incorporated by reference herein in its entirety, although the invention is not limited to these teachings.

Overview

Mobile clients request and use information from a variety of enterprise data sources. Mobile applications enable mobile clients to create, modify, and otherwise access enterprise data, which may be stored within documents, objects, or other data structures. Data created or updated by a mobile client, whether connected or offline, needs to be synchronized with the system of record. However, data cached on a mobile device can become outdated when source data is updated. The embodiments described herein provide ways to identify and resolve cache conflicts occurring when data held by an offline mobile device is changed in another system.

For example, in an embodiment, a mobile client requests data from an enterprise data source using a mobile application. The request is received by middleware configured to communicate partial or full documents and change sets with mobile clients while providing full document support for enterprise data sources. The middleware is also configured to cache full documents and other data structures locally. The centrally cached documents may be used to service requests for data from other mobile clients and to help reduce the overall number of requests made to enterprise data sources.

Next, in an embodiment, the middleware searches its local cache for a copy of the document containing the requested data. The middleware then queries the enterprise data source when the data is not available in its local cache. The middleware requests the full document (e.g., XML, JSON, iDoc, etc.) containing the enterprise data requested by the mobile client. However, even though the backend system of record (e.g., SAP, DBMS, etc.) manages the information as a business document, business object, or other unit of work, the mobile client may only need a subset or partial set of this data.

In an embodiment, the middleware prepares and returns a full or partial set of data to the mobile client in response to the initial request. The mobile application is then used to create new data and modify data in the partial dataset. Such updates may occur whether the mobile device is online or offline. However, the data held by the mobile device may have already changed in the system of record before the updates are received by the middleware for processing.

For example, in an embodiment, a different mobile device may update some or all of the same data using the same middleware, resulting in a new version of the data in both the system of record and in middleware cache. In addition, the system of record may also receive direct updates or updates from other systems. Thus, conflicting versions of data may exist on a mobile device and in other systems. These conflicts need to be identified and resolved to ensure the consistency and validity of data throughout an enterprise.

Example Network Architecture

Figure 1:
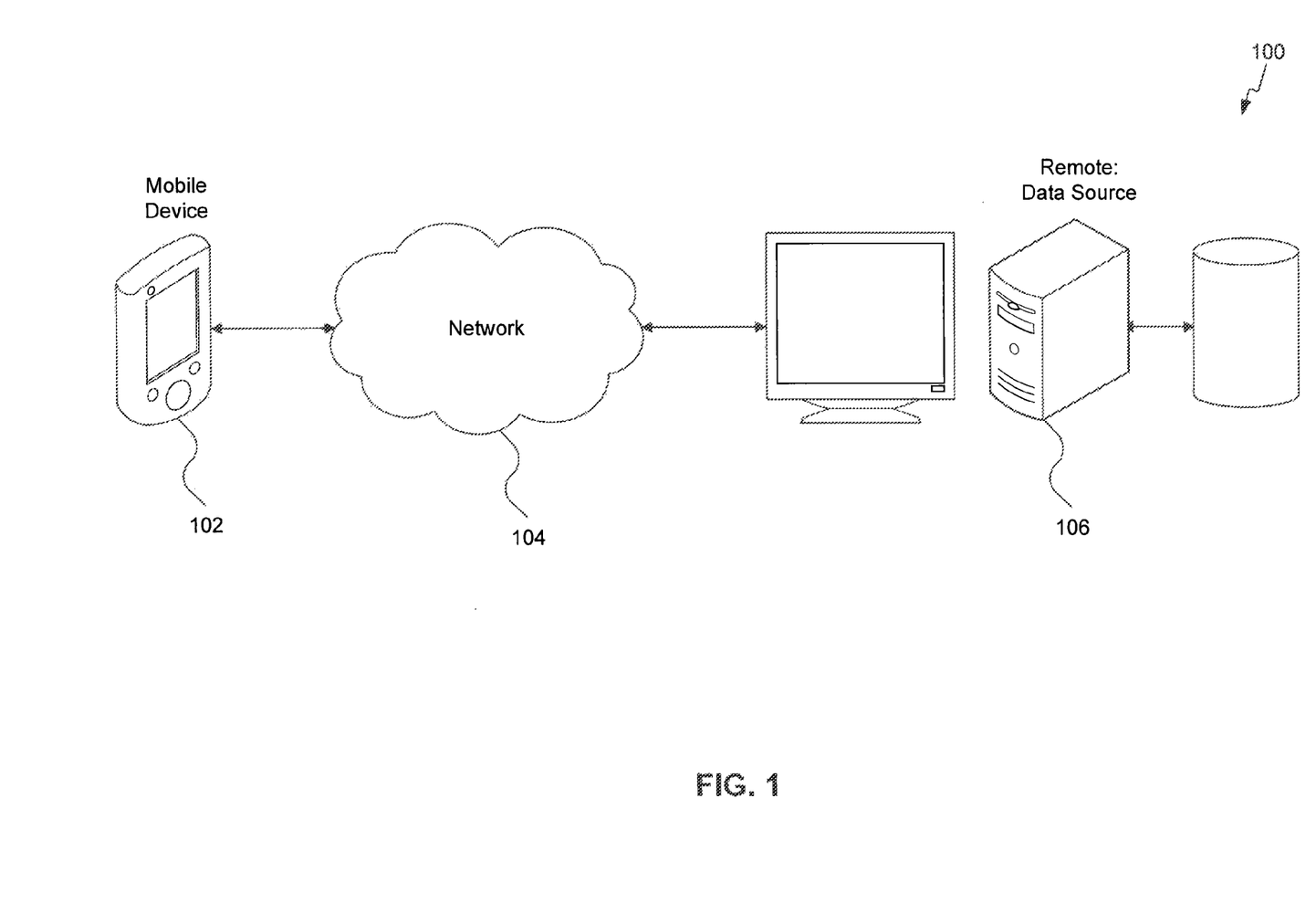
FIG. 1 is an exemplary network architecture in which embodiments of the present invention, or portions thereof, can be implemented.

FIG. 1 is an example network architecture 100 in which embodiments of the present invention, or portions thereof, can be implemented. Network architecture 100 includes a mobile device 102 connected using network 104 to server 106, in accordance with an embodiment of the present invention. In accordance with another embodiment of the present invention, a software application is deployed on mobile device 102. The software application is written to occasionally retrieve data from server 106. When the software application attempts to retrieve data from server 106, network 104 may or may not be available. Embodiments described herein refer to mobile devices, such as mobile device 102. However, it should be understood that this is not intended to be limiting and that other embodiments may include any computing device connected over a network 104 to a server.

For example, according to an embodiment, mobile device 102 may be any computing device designed for personal use by a user or integrated with other computer systems or computing devices for use by an end-user. For example, mobile device 102 may include any computing device such as a desktop computer, laptop, tablet, smartphone, gaming system, navigation device, portable media player, mobile device, electronic device, and computing devices embedded into other systems including, for example, automobiles and appliances. Mobile device 102 may also include any other type of computer system having at least one processor and memory.

Network 104 can be any network or combination of networks that can carry data communications. Such a network can include, but is not limited to, a wired (e.g., Ethernet) or a wireless (e.g., Wi-Fi and 4G) network. In addition, the network may include, but is not limited to, a local area network, and/or wide area network such as the Internet. The network can support protocols and technology including, but not limited to, Internet or World Wide Web protocols and/or services. Intermediate network routers, gateways, or servers may be provided between servers and clients depending upon a particular application or environment.

Server 106 and any combination of its components, may be part of, or may be implemented using, one or more computing devices. Such server-based computing devices may include, but are not limited to, one or more standalone servers, distributed computing systems, clustered computer systems, cloud computing systems, and grid computing systems.

Example Framework

Figure 2:
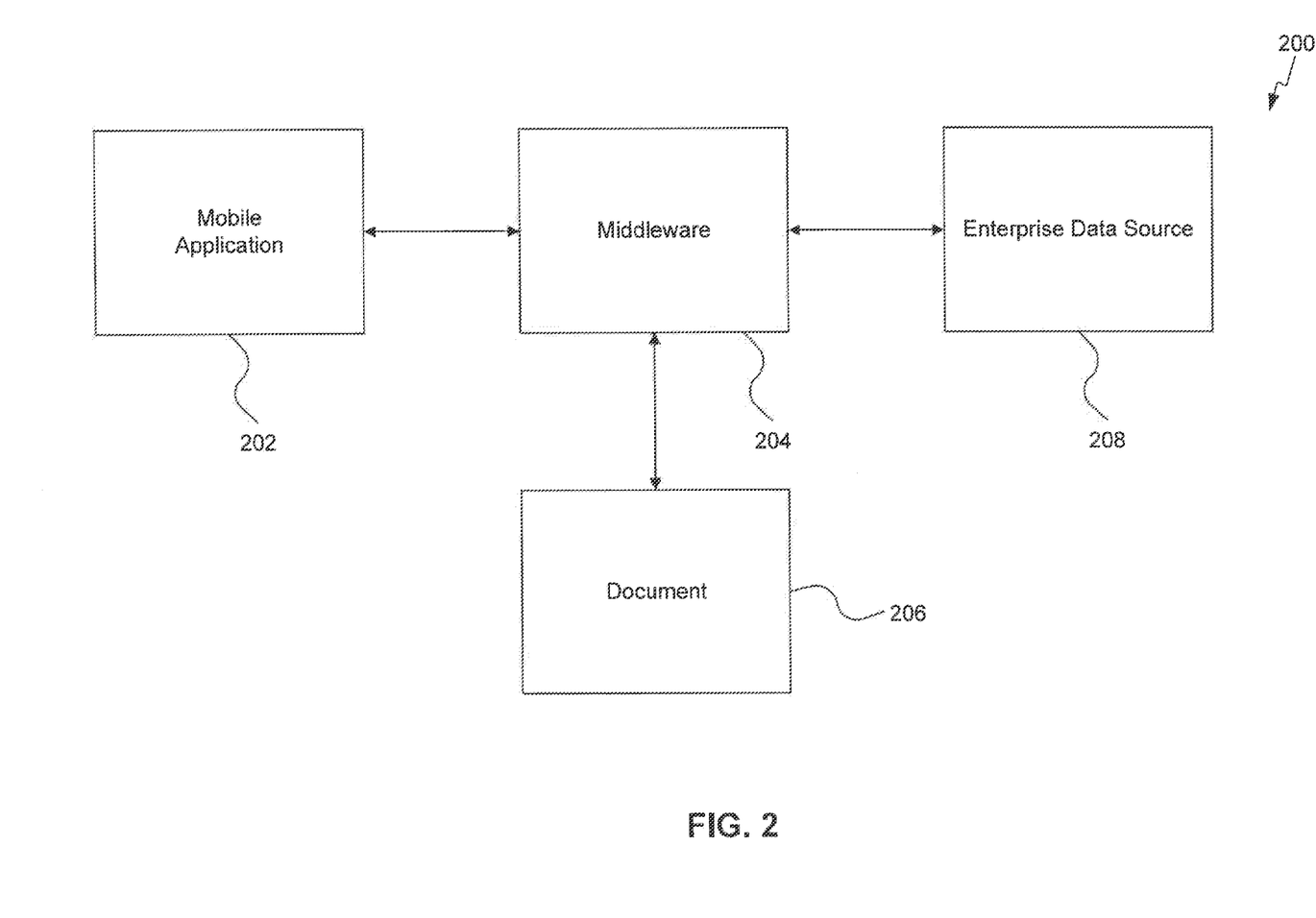
FIG. 2 is an example system framework, according to an embodiment.

FIG. 2 is an example framework 200, in accordance with an embodiment of the present invention. Framework 200 defines a mobile application 202, middleware 204, document 206, and enterprise data source 208, in accordance with an embodiment of the present invention. One skilled in the relevant arts will appreciate that the arrangement shown in framework 200 is presented by way of example, and not limitation. In accordance with an embodiment of the present invention, mobile application 202 is operable to execute on mobile device 102. In accordance with a further embodiment of the present invention, enterprise data source 208 is equivalent to server 106.

Mobile application 202 accesses data from enterprise data source 208 by making calls to an API or other interface provided by middleware 204, in accordance with an embodiment of the present invention. In accordance with an embodiment of the present invention, middleware 204 is the iAnywhere Mobilink, iMO and SUP middleware provided by Sybase, Inc. of Dublin, Calif. One skilled in the relevant arts will appreciate that enterprise data source 208 may be any number of types of data sources, including, for example, a relational database or a remote procedure. Middleware 204 facilitates communications, through the use of its API, by an application to one or more data sources, such as enterprise data source 208.

Document 206 is a representation of data in any form and type contained in enterprise data source 208, in accordance with an embodiment of the present invention. For example, many data sources, enterprise applications, and systems of record have the ability to manage data as a graph, an XML document, a JSON document, an iDoc, or another specific representation of data. For example, a system of record may contain an order having specific line items, which reference product information. Such information can be represented as a graph of data with a plurality of nodes and may be contained within a single business document.

According to an embodiment, document 206 may represent multiple: data sources (e.g., document 206 may comprise subsets of data from multiple data sources). According to another embodiment, document 206 may include metadata, which may be interpreted by the software of mobile application 202 to facilitate access of the data from enterprise data source 208 through middleware 204.

In an embodiment, not intended to limit the invention, enterprise data source 208 provides access to enterprise resources, As an example, enterprise resources (ERs) include, but are not limited to, database management systems (DBMS), SAP enterprise systems, web services, data files, hypertext transfer protocol (HTTP) systems and even spreadsheets. In addition, and according to another embodiment, third parties (e.g., customers, software vendors, etc.) may extend functionality of enterprise data source 208 to include, for example, integration with additional data sources (not shown).

Figure 3:
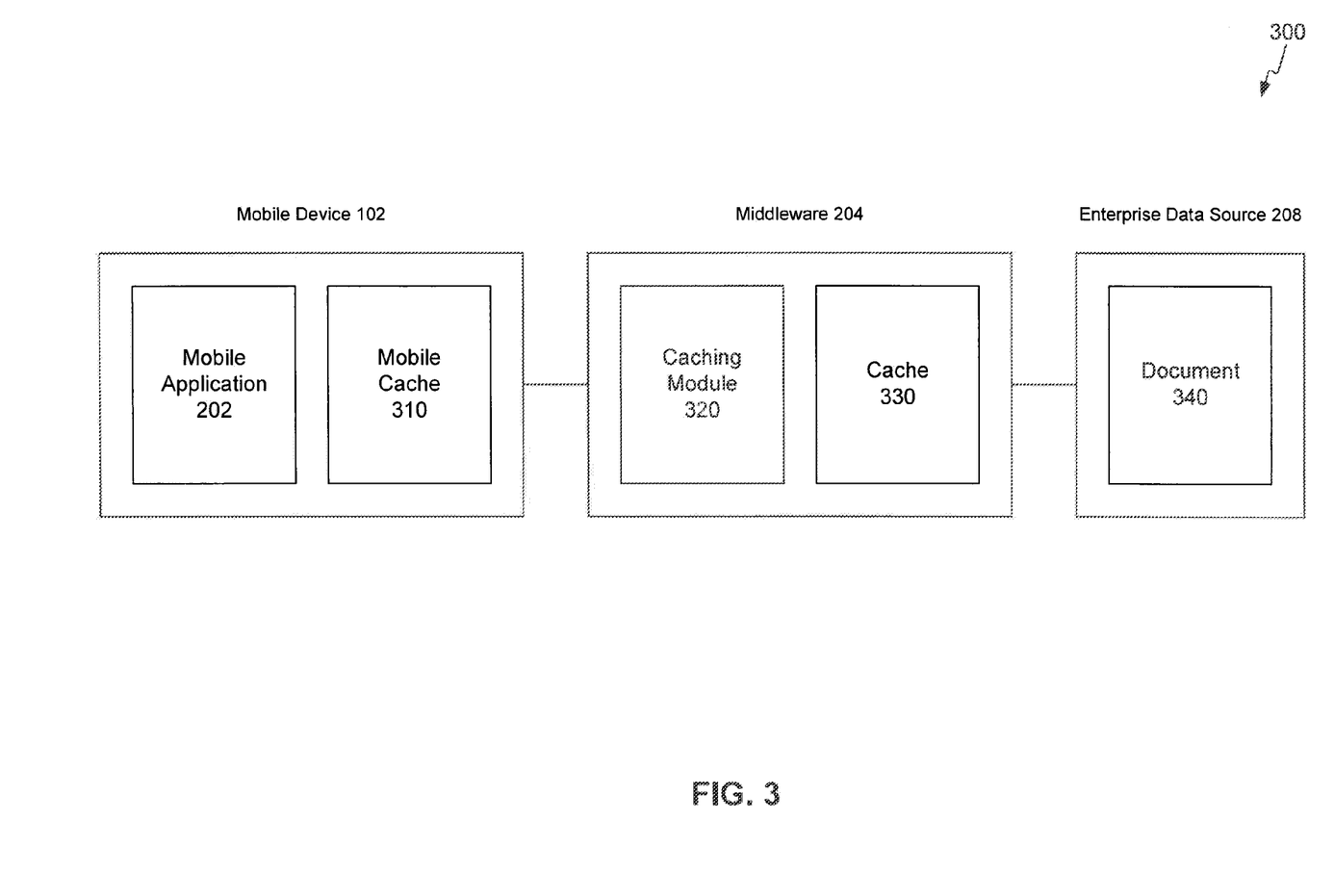
FIG. 3 is a diagram illustrating a system for synchronizing data between a mobile application and an enterprise data source, according to an embodiment.

System for Synchronizing Data between a Mobile Application and an Enterprise Data Source FIG. 3 is a diagram illustrating a system for synchronizing data between a mobile application and an enterprise data source, according to an embodiment, System 300 includes mobile device 102, middleware 204 and enterprise data source 208.

According to an embodiment, mobile device 102 is an occasionally connected computing device that executes at least one mobile application 202. Additionally, mobile device 102 includes mobile cache 310. In an embodiment, mobile cache 310 may be used to receive and store numerous sets of data, some or all of them being partial sets of data, which mobile device 102 receives from middleware 204. Further, mobile cache 310 may store modified versions of datasets (full or partial) created by an offline mobile device 102 that middleware 204 will later use to update enterprise data source 208.

According to another embodiment, the modified versions of datasets may be stored in mobile cache 310 while mobile device 102 is not connected to a network. Mobile application 202 may be configured to synchronize one or more versions of the datasets with middleware 204 when mobile device 102 reconnects to a network. In an alternative embodiment, one or more modified version of enterprise data may be pushed to middleware 204 or pulled by middleware 204 on a scheduled or unscheduled basis.

Middleware 204 includes caching module 320 and cache 330. In an embodiment, middleware 204 acts as an interface between mobile application 202 and enterprise data source 208. For example, middleware 204 may be configured to allow clients to access enterprise data in partial datasets without having to transport an entire document or dataset between mobile device 102 and enterprise data server 208. Thus, middleware 204 may manage the state of the document or full dataset on behalf of mobile device 102, which may only be concerned with partial sets of data.

In another embodiment, middleware 204 reduces unwanted or unexpected loads (e.g., unpredictable data requests) on enterprise data source 208 using caching module 320 and cache 330. In particular, according to an embodiment, middleware 204 services mobile application data requests using caching module 320 and cache 330. Thus, at times, mobile application 202 need not invoke direct requests on enterprise data source 208 or any other backend enterprise information systems. In this way, embodiments of the present invention efficiently service mobile application data requests while shielding data sources from being negatively impacted or overloaded by the requests.

Enterprise data source 208 includes document 340. Enterprise data source 208 may represent one or more data sources that exist within an enterprise environment. For example, enterprise data source 208 may include, but is not limited to, database management systems (DBMS), data warehouses, SAP enterprise systems, custom software applications, web services, data files, hypertext transfer protocol (HTTP) systems and also spreadsheets. In an embodiment, enterprise data source 208 manages data using one or more of a graph, an XML document, a JSON document, an iDoc, or other types of data collections.

Document 340 generally represents a collection of data or objects. In another embodiment, mobile application 202 requests data from enterprise data source 208. Caching module 320 receives the request and makes a corresponding request to enterprise data source 208 on behalf of mobile device 102. Enterprise data source 208 provides document 340 to caching module 320, which then places document 340 in cache 330. Caching module 320 identifies the partial set of data requested by mobile application 202 existing in document 340. Caching module 320 then responds to mobile application 202 by providing the partial dataset.

In a further embodiment, mobile application 202 creates a new version of the partial dataset while mobile device 102 is offline. The modified version of the partial dataset is then stored in mobile cache 310 until mobile device 102 is able to provide the update to middleware 204 for processing.

However, some or all of the data included in the original partial dataset used by mobile device 102 already may have been updated by another system, application, or device. For example, mobile device 102 may receive a full or partial dataset and then go offline for several hours. During this time, one or more updates to the original data may have occurred. Therefore, caching module 320 is configured to identify when an update has been requested based on an outdated version of data. Further, caching module 320 also may perform cache conflict resolution, if needed.

For example, in an environment where all updates to enterprise data source 208 pass through middleware 204, caching module 320 may perform cache conflict detection using its own cached copy of document 340. In environments where updates to enterprise data source 208 occur directly or using at least one system other than middleware 204, caching module 320 may check with enterprise data source 208 to determine whether source document 340 already has been updated. Once a cache conflict has been identified, the conflict is further analyzed, and one or more forms of cache conflict resolution may be performed. Cache conflict identification and resolution is discussed in greater detail below with respect to FIG. 5 and FIG. 6.

Figure 4:
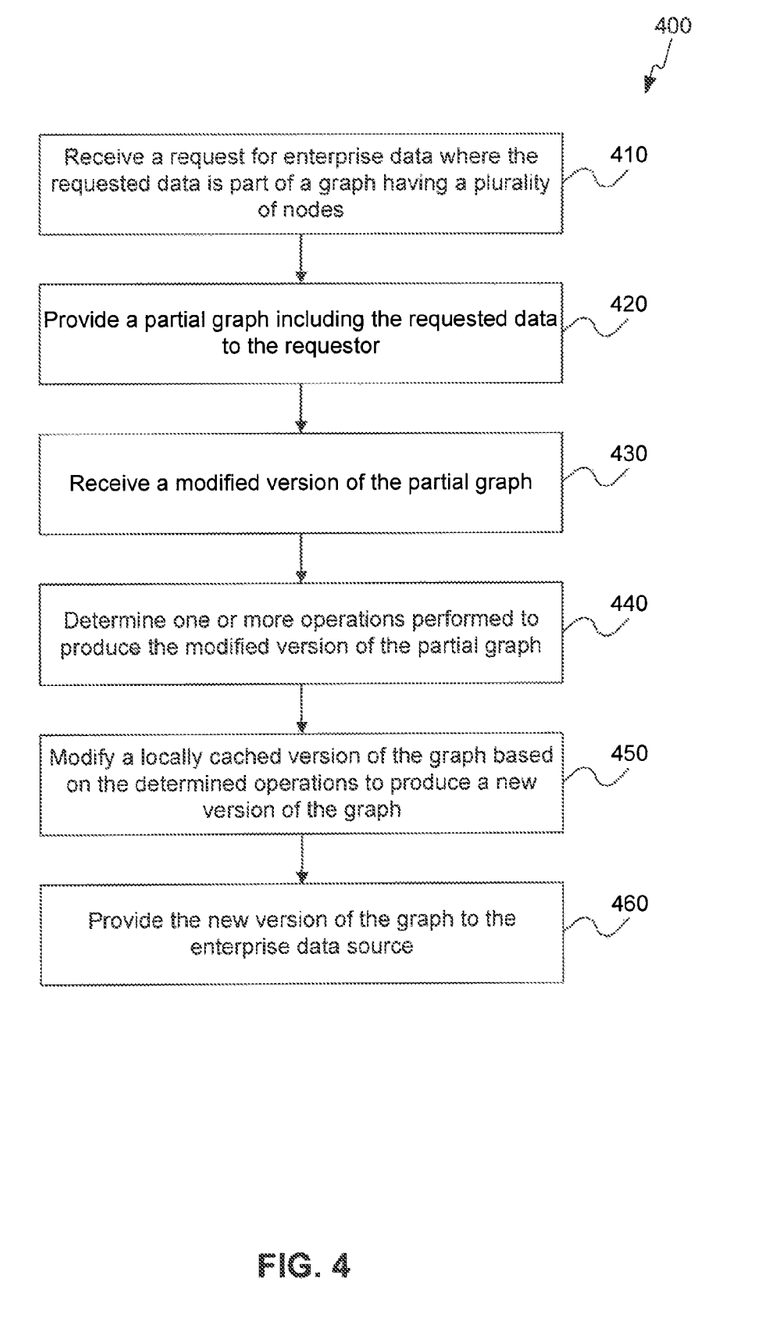
FIG. 4 is a flow diagram of a method for synchronizing data between a mobile application and an enterprise data source, without cache conflict detection, according to an embodiment.

Method for Synchronizing Data between a Mobile Application and an Enterprise Data Source FIG. 4 is a flow diagram of a method for synchronizing data between a mobile application and an enterprise data source, without cache conflict detection, according to another embodiment.

Method 400 begins at step 410, when a request for data is received from an application executing on an occasionally connected mobile device. According to an embodiment, mobile application 202 requests data from an enterprise data source 208, which has the ability to manage data as a document capable of being represented as a graph having a plurality of nodes.

In an embodiment, mobile application 202 is configured to send requests for enterprise data to middleware 204. For example, mobile application 202 may be configured to send data requests to caching module 320 using an Application Programming Interface (API), which may include a REST-based or other type of web service.

In an embodiment, caching module 320 receives a request from mobile application 202 for data residing on enterprise data source 208. Caching module 320 may first search cache 330 to determine whether the requested data is available locally. For example, caching module may have stored data previously requested by or more mobile clients in cache 330. Caching module 320 may then service the request using a cached version of the data available in cache 330 instead of requesting the data from enterprise data source 208.

In some embodiments, clients and systems may access enterprise data source 208 either directly or using one or more systems other than middleware 204. In these scenarios, a version of a document stored in cache 330 could become stale. Thus, caching module 320 may also be configured to synchronize a version of a document in local cache 330 with a newer version from enterprise data source to avoid providing mobile device 102 with outdated data. For example, caching module 320 may perform a check periodically or based on a request to determine whether a newer version of a cached document is available from enterprise data source 208.

In another embodiment, caching module 320 determines that the data requested by mobile application 202 is not available in cache 330. Caching module 320 then requests and receives the data from enterprise data source 208. For example, the requested data may include document 340.

According to an embodiment, caching module 320 may persist, for some time period, data, result sets, objects, and documents, such as document 340, in cache 330. Thus, a subsequent requestor, either the same or another mobile device, can benefit from data previously stored within cache 330, helping to reduce the overall number of requests made to enterprise data source 208.

At step 420, a partial graph including at least the requested data is provided to mobile application 202. In an embodiment, caching module 320 provides mobile application with a partial set of data from a larger dataset that originated from enterprise data source 208.

For example, a mobile application may request data associated with a single service ticket. However, enterprise data source 208 may store or provide the requested service ticket data with other information, such as related service tickets by date or by user. Caching module 320 is configured to provide a partial dataset that includes the requested data to mobile application 202.

According to another embodiment, mobile application 202 receives the partial dataset and may store its own local copy in mobile cache 310. Mobile application 202 then modifies the partial dataset while mobile device 102 is either online or offline. For example, when mobile device 102 is offline, one or more modified versions of the partial dataset may be stored in mobile cache 310 until mobile device 102 is able to reconnect to middleware 204.

At step 430, a modified version of the partial graph is received from the mobile application. In an embodiment, caching module 320 receives one or more modified versions of the partial graph stored in mobile cache 310.

According to an embodiment, mobile application 202 may be used to create, update and delete data associated with a partial dataset, thus creating a modified version of the partial dataset. One or more modified versions of the partial dataset then may be stored in mobile cache 310 and then later communicated to middleware 204 for graph merge processing with an associated dataset.

However, partial datasets stored in mobile cache 310 may become outdated based on one or more updates made by other mobile devices through middleware 204, Further, an enterprise data source may be configured to receive updates either directly or using other applications, systems, and middleware. In some embodiments, as described in greater detail with respect to FIG. 5 and FIG. 6 below, cache conflict detection is performed by caching module 320 after receiving the partial data set and before providing the data to an enterprise data source.

At step 440, the operations that were performed to produce the modified version of the partial graph are determined. According to an embodiment, caching module 320 determines one or more operations that were performed on the partial dataset by mobile application 202. For example, caching module 320 can derive the delta or the operations performed against the partial dataset by comparing the modified version of the dataset with an earlier version of the partial dataset or the full version of the document from which the partial dataset originated.

At step 450, a locally cached version of the graph is modified, based on the determined operations that were performed on the partial graph, thus producing a new version of the document. In an embodiment, caching module 320 modifies a cached version of document 340 available in cache 330 based on the one or more operations that were determined to create the modified partial dataset. Thus, caching module 320 synchronizes document 340 with the changes that were made to the corresponding partial dataset, producing a new version of document 340.

At step 460, the new version of the graph is provided to the enterprise data source.

According to an embodiment, caching module 320 provides the new version of document 340 to enterprise data source 208. Thus, caching module 320 completes the changes made to the partial dataset by providing a full, new version of document 340 to enterprise data source 208.

In the above, flow diagram 400 was described with reference to partial datasets for illustrative purposes. However, embodiments are applicable to full datasets.

Cache Conflict Detection Not Requiring Source System Validation

Figure 5:
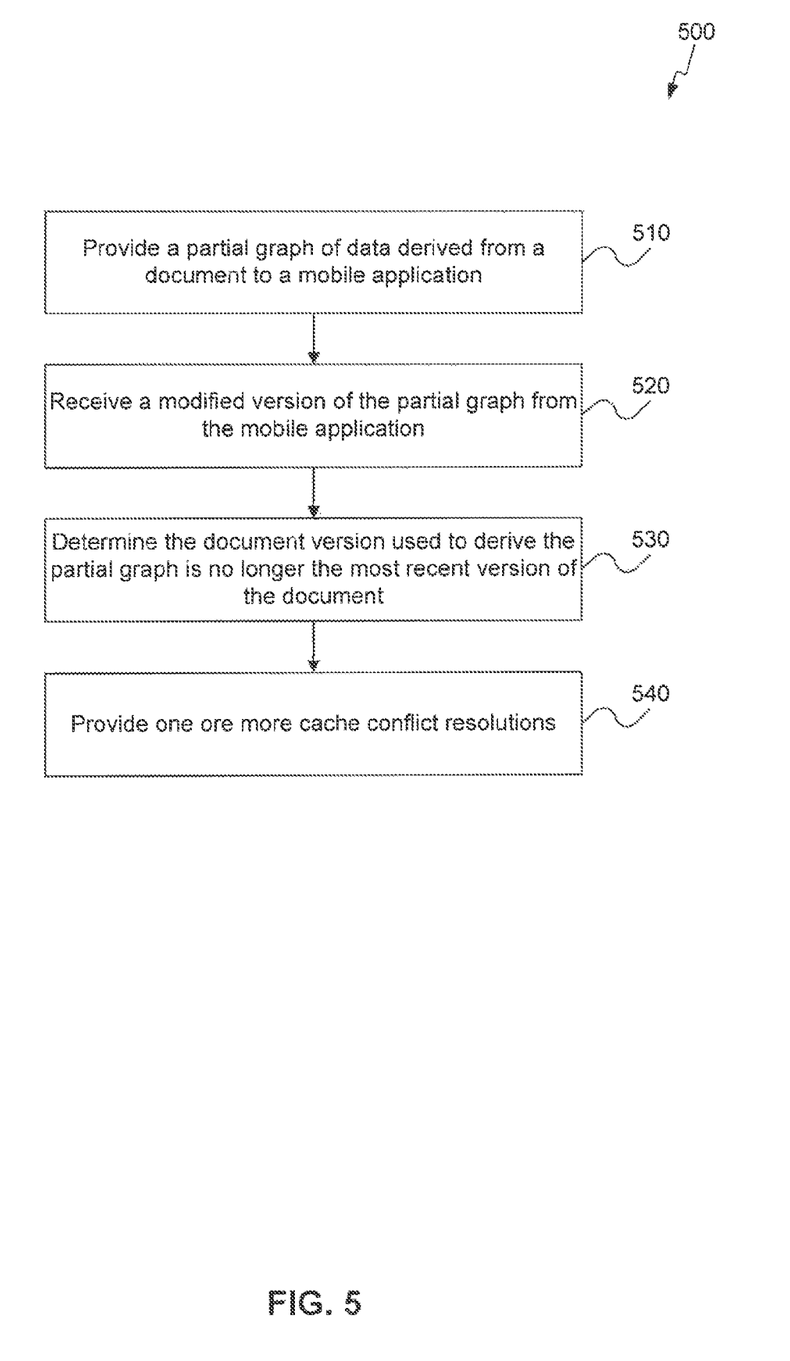
FIG. 5 is a flow diagram illustrating cache conflict detection without source system validation, according to an embodiment.

FIG. 5 is a flow diagram illustrating cache conflict detection without source system validation, according to an embodiment. Cache conflict detection without source system validation refers to the ability of middleware 204 to assume that the version of document 340 available in cache 330 is always the latest version. This assumption may be used when carrying out cache conflict detection.

For example, in some embodiments, enterprise source system 208 is configured only to receive updates from caching module 320. Therefore, enterprise source system. 208 will not be updated directly or via any external mechanism that does not utilize middleware 204. When all updates to enterprise source system 208 must flow through caching module 320, middleware 204 can assume that any document available in cache 330 is the latest version. Thus, middleware 204 need not perform an additional check for the latest version on enterprise source system 208.

In another embodiment, one or more specific collections or subsets of data available on enterprise source system 208 may only he updated using middleware 204. Thus, updates to these collections and subsets of data may utilize cache conflict detection without system validation even though other parts of enterprise source system 208 may possibly receive updates directly or from sources other than middleware 204.

At step 510, a partial graph of data derived from a document is provided to a mobile application. In an embodiment, caching module 320 provides a partial graph of data derived from document 340 to mobile application 202.

At step 520, a modified version of the partial graph is received from the mobile application. In one embodiment, caching module 320 receives a modified version of the partial graph from mobile application 202, which introduces one Or more changes to the partial graph originally derived from document 340.

At step 530, a determination is made that the document version used to derive the partial graph is no longer the latest version of the document. In an embodiment, caching module 320 determines that an update has been made to document 340 since the time the partial graph was provided to mobile application 202. For example, caching module 320 may compare information or data from a document 340 in cache 330 to information available in one or more of the modified partial graph and middleware 202 to make the determination.

At step 540, one or more cache conflict resolutions are provided. In an embodiment, caching module 320 further determines whether changes introduced by the modified partial dataset conflict with the latest version of document 340. Cache conflict resolution may include, but is not limited to, automatic cache conflict resolution and manual cache conflict resolution.

In an embodiment, caching module 320 may automatically resolve cache conflicts. Automatic cache conflict resolution may occur based on one or more configurable system settings on middleware 204 and one or more configurable user settings on mobile application 202. Thus, caching module 320 may be configured to automatically merge one or more portions a modified partial dataset with the latest version document 340.

For example, an updated service ticket document may include a new status while a subsequently submitted modified partial dataset provides updated user contact information. Caching module 320 may automatically merge these changes into a new version of the document based one or more system or application settings allowing automatic merging of non-conflicting updates. In other embodiments, automatic merging of changes may occur based on one or more of business rules, user identity, user priority, update type, field type, and document type.

In an alternative embodiment, caching module 320 may request one or more manual merge instructions from application 202, which may be provided to a user of mobile application 202 for resolution. For example, manual merging may occur when automatic resolution of conflicting updates is not possible or is not desired in a particular situation. Further, manual merging may be performed based one or more of a system setting, a mobile application 202 setting, or by default.

Additional embodiments may include the combination of one or more types of cache conflict resolutions. For example, it is possible to automatically merge non-conflicting fields while then performing manual merging of conflicting updates. Other embodiments may involve full datasets.

Cache Conflict Detection Requiring Source System Validation

Figure 6:
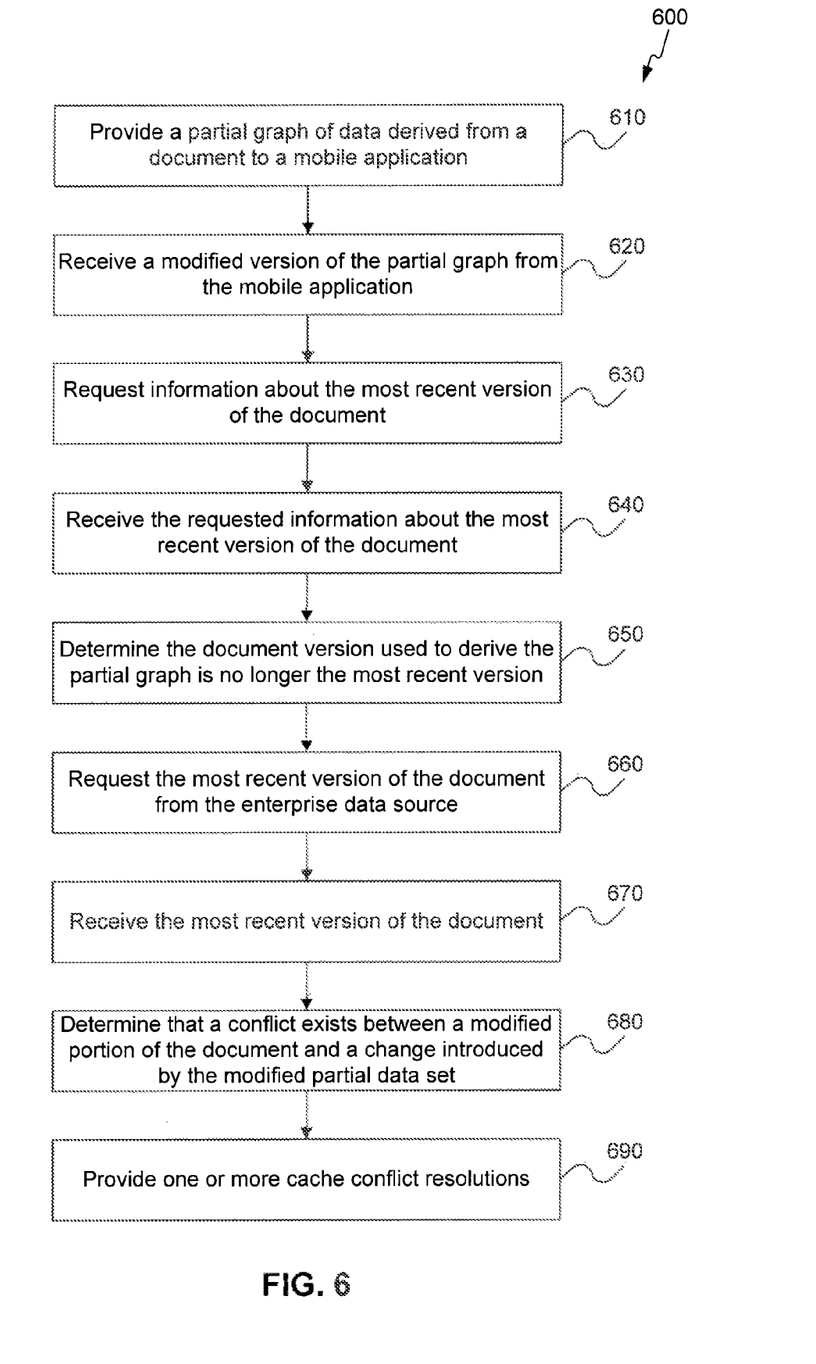
FIG. 6 is an additional flow diagram illustrating cache conflict detection requiring source system validation, according to an embodiment.

FIG. 6 is a flow diagram illustrating cache conflict detection requiring source system validation, according to an embodiment. This embodiment refers to the necessity of having to check whether a new version of a document has been created at the source before performing cache conflict detection. Source system validation is required when a source system may be updated independent of middleware 204. In this scenario, middleware 204 cannot assume that a cached document is the latest version because a newer version may already exist at the source. In related embodiments, middleware 204 must perform source system validation each time prior to determining whether a cache conflict exists.

In an embodiment, enterprise source system 208 also receives updates directly or using at least one system not involving middleware 204. For example, one or more users and systems may have the ability to directly update enterprise source system 208. In addition, one or more other applications may modify data held by enterprise source system 208 or use other non-related middleware and services to perform updates. As a result, middleware 204 cannot automatically assume that a document stored in cache 330 is the latest version because a newer version may have been created on enterprise source system 208.

At step 610, a partial graph of data derived from a document is provided to a mobile application.

At step 620, a modified version of the partial graph is received from the mobile application.

At step 630, information about the most recent version of the document is requested. In an embodiment, caching module 320 requests information about document 340 from enterprise data source 208. The requested information may include one or more of a document number, version number, timestamp, and other information that can be used to determine whether a new version of document 340 has been created.

In an alternative embodiment, steps 630-650 may be skipped by directly requesting document 340 from enterprise data source 208. For example, the requested document may be compared to a related cached version of the document when determining the latest version.

At step 640, information about the most recent version of the document is received based on the request made in step 630. In an embodiment, caching module 320 receives the requested information about the most recent version of document 340 from enterprise data source 208.

At step 650, a determination is made that the document used to derive the partial graph is no longer the most recent version. In an embodiment, caching module 320 compares one or more aspects of the information received about a version of document 340 on enterprise data source 208 with available information about a version of document 340 most recently utilized by middleware 204.

At step 660, the most recent version of the document is requested. In an embodiment, caching module 320 requests and receives the most recent version of the document from enterprise data source 208. Caching module 320 performs the request based on the determination made in step 650 that a cached document 340 is not the latest version.

At step 670, the most recent version of the document is received based on the request made in step 660. In an embodiment, caching module 320 receives the latest version of document 340 from enterprise data source 208.

At step 680, a determination is made that a conflict exists between a modified portion of the most recent version of the document and a change introduced by the modified partial dataset. For example, when a cache conflict occurs, one or more changes introduced in an updated dataset may conflict with changes that were made to a source document. Thus, in one embodiment, caching module 320 may determine that a modified partial dataset seeks to update data which no longer exists in the latest version of document 340. Different types of conflicts existing between updated data can be addressed using various forms of cache conflict resolution.

At step 690, one or more cache conflict resolutions are provided. In an embodiment, both conflicting and non-conflicting data changes may be merged both automatically or manually by caching module 320 when producing a new document. Further, one or more system, application, and user settings may be used to determine how the merging of data updates will be resolved.

For example, one or more non-conflicting updates may be merged automatically based on a system or application setting. Such conflicts also may be resolved based on user instructions received from mobile application 220. Also, for example, one or more conflicting updates, perhaps to the same field, may be resolved based on settings, business rules, or user intervention.

In an embodiment, middleware 204 alerts mobile application 202 that a conflict was detected and may or may not request further instruction for resolving the conflict. In another embodiment, middleware 204 may provide a revised partial dataset based on the latest version of the document to mobile application 202 so that a user can perform a manual merge, if desired, based on the latest version of the document. Other embodiments may involve full datasets.

In additional embodiments, caching module 320 merges changes into a new document using one or more cache conflict resolution techniques. Caching module 320 then provides the new document to enterprise data source 208 to update the source system.

Example Computer System

Figure 7:
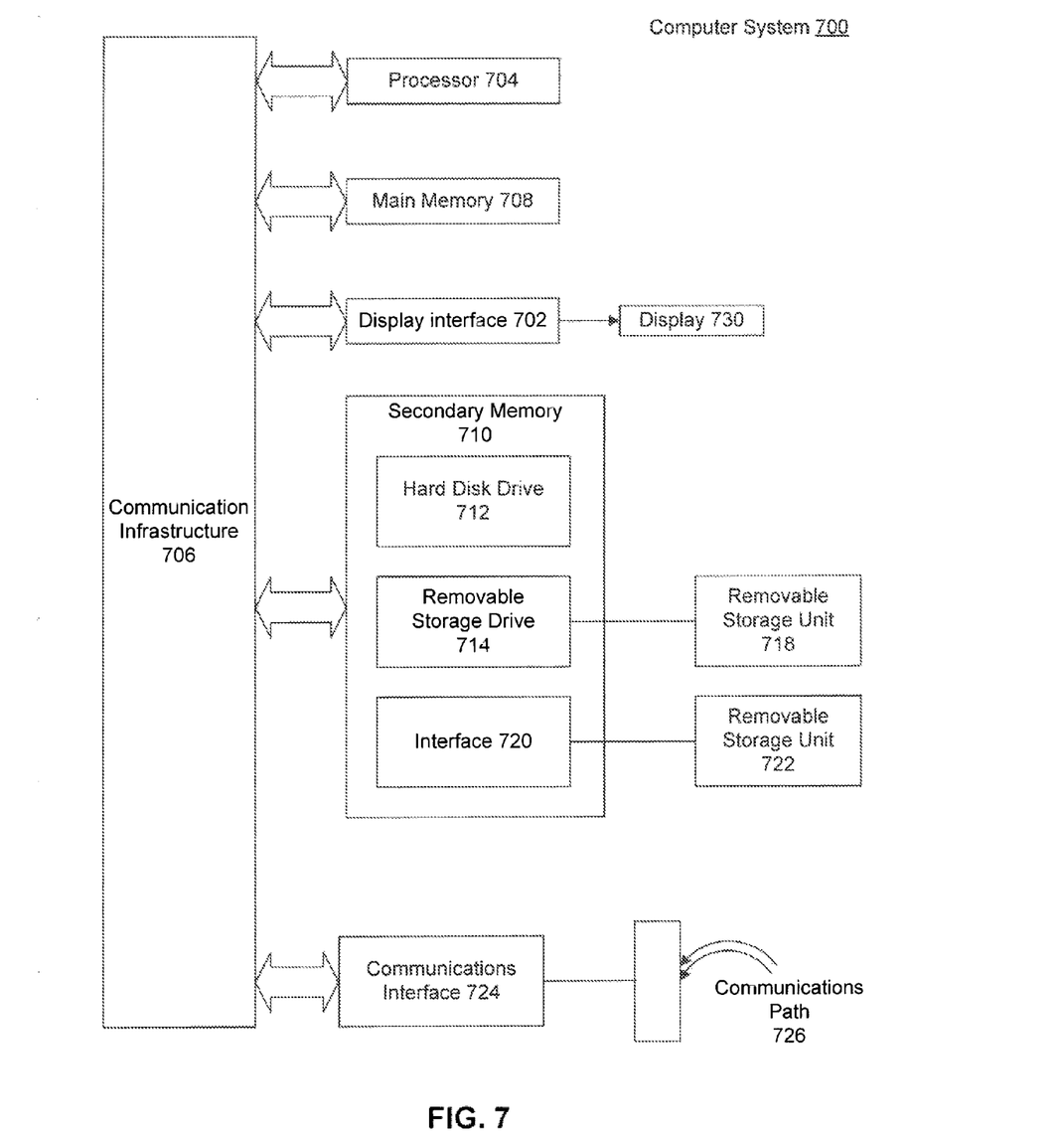
FIG. 7 is a diagram of an exemplary computer system that may be used in an embodiment.

In an embodiment, the system and components of embodiments described herein are implemented using well-known computers, such as example computer system 700 shown in FIG. 7.

Computer system 700 includes one or more processors (also called central processing units, or CPUs), such as a processor 704. Processor 704 is connected to a communication infrastructure 706.

Computer system 700 also includes a main or primary memory 708, such as random access memory (RAM). Main memory 708 has stored control logic (computer software), and data.

Computer system 700 may also include one or more secondary storage devices 710. Secondary storage device 710 includes, for example, a hard disk drive 712 and/or a removable storage device or drive 714, as well as other types of storage devices, such as memory cards and memory sticks. Removable storage drive 714 represents a floppy disk drive, a magnetic tape drive, a compact disk drive, an optical storage device, tape backup, etc.

Removable storage drive 714 may interact with a removable storage unit 718. Removable storage unit 718 includes a computer usable or readable storage device having stored thereon computer software (control logic) and/or data. Removable storage unit 718 represents a floppy disk, magnetic tape, compact disk, DVD, optical storage disk, or any other computer data storage device. Removable storage drive 714 may read from and/or write to removable storage unit 718 in a well-known manner.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 also includes input/output/display devices 730, such as monitors, keyboards, pointing devices, etc., which communicate with communication infrastructure 706 through a display interface 702.

Computer system 700 further includes a communication or network interface 724. Communication interface 724 may enable computer system 700 to communicate with remote devices. For example, communication interface 724 may allow computer system 700 to communicate over communications path 726, such as LANs, WANs, the Internet, etc. Communications interface 724 may interface with remote sites or networks via wired or wireless connections.

Control logic may be transmitted to and from computer system 700 via communication path 726.

Any tangible apparatus or article of manufacture comprising a computer useable or readable medium having control logic (software) stored thereon is referred to herein as a computer program product or program storage device. This includes, but is not limited to, computer system 700, main memory 708, secondary storage device 710, and removable storage unit 718. Such computer program products, having control logic stored thereon that, when executed by one or more data processing devices, causes such data processing devices to operate as described herein, represent embodiments of the invention.

Embodiments can work with software, hardware, and/or operating system implementations other than those described herein. Any software, hardware, and operating system implementations suitable for performing the functions described herein can be used. Embodiments are applicable to both a client and to a server or a combination of both.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein. for the convenience of the description. Alternate boundaries can be defined so long as the specified functions and relationships thereof are appropriately performed. The breadth and scope of the present invention should not be limited by any of the above-described embodiments.

In addition, the foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to he interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for performing cache conflict detection, comprising:
providing, by a middleware device, a partial graph of data to an application executing on a mobile device, wherein the partial graph of data is derived from a source document comprising a graph of data having a plurality of nodes;
receiving, from the application executing on the mobile device, a modified partial graph of data, wherein the modified partial graph of data includes one or more changes to the partial graph of data;
generating an information request to a remote enterprise data source to identify (i) a first difference between a version of the partial graph of data locally cached at the middleware device and the received modified partial graph of data, and (ii) a second difference between the partial graph of data locally cached at the middleware device and changes made directly to the source document at the remote enterprise data source by a second mobile device;
merging the first difference and the second difference to generate an updated version of partial graph of data locally cached at the middleware device; and
providing the updated version of the partial graph of data locally cached at the middleware device to the mobile device, the remote enterprise data source, and the second mobile device.

2. The method of claim 1, further comprising:
receiving information about the source document at the remote enterprise data source based on the information request to the remote enterprise data source;
storing the information in a local cache of the remote enterprise data source; and
comparing the information to a delta associated with the modified partial graph of data.

3. The method of claim 1, further comprising:
receiving a most recent version of the source document from the enterprise data source.

4. The method of claim 3, further comprising:
automatically merging one or more changes introduced by the modified partial graph with the most recent version of the source document while producing a new version of the source document.

5. The method of claim 3, further comprising:
merging one or more changes introduced by the modified partial graph with the most recent version of the source document based on at least one instruction received from the mobile application when producing a new version of the source document.

6. The method of claim 3, further comprising:
sending an alert to the mobile application indicating at least one change introduced by the modified partial graph of data could not be merged with the new version of the source document; and
providing the mobile application with the most recent version of the source document.

7. The method of claim 3, further comprising:
merging one or more changes introduced by the modified partial graph of data with the most recent version of the source document based on one or more cache conflict resolution configuration settings when producing a new version of the source document.

8. A server-based system for performing cache conflict detection, comprising:
a caching module, implemented with a processor-based device, configured to:
provide a partial graph of data to an application executing on a mobile device, wherein the partial graph of data is derived from a source document comprising a graph of data having a plurality of nodes;
receive, from the application executing on the mobile device, a modified partial graph of data, wherein the modified partial graph of data includes one or more changes to the partial graph of data;
generate an information request to a remote enterprise data source to identify (i) a first difference between a version of the partial graph of data locally cached at the middleware device and the received modified partial graph of data, and (ii) a second difference between the partial graph of data locally cached at the middleware device and changes made directly to the source document at the remote enterprise data source by a second mobile device;
merge the first difference and the second difference to generate an updated version of partial graph of data locally cached at the middleware device; and
provide the updated version of the partial graph of data locally cached at the middleware device to the mobile device, the remote enterprise data source, and the second mobile device.

9. The system of claim 8, wherein the caching module is further configured to:
receive information about the source document at the remote enterprise data source based on the information request to the remote enterprise data source;
store the information in a local cache of the remote enterprise data source; and
comparing the information to a delta associated with the modified partial graph of data.

10. The system of claim 8, wherein the caching module is further configured to:
receive a most recent version of the source document from the enterprise data source.

11. The system of claim 10, wherein the caching module is further configured to:
automatically merge one or more changes introduced by the modified partial graph with the most recent version of the source document while producing a new version of the source document.

12. The system of claim 10, wherein the caching module is further configured to:
merge one or more changes introduced by the modified partial graph with the most recent version of the source document based on at least one instruction received from the mobile application when producing a new version of the source document.

13. The system of claim 10, wherein the caching module is further configured to:
send an alert to the mobile application indicating at least one change introduced by the modified partial graph of data could not be merged with the new version of the source document; and
provide the mobile application with the most recent version of the source document.

14. The system of claim 10, wherein the caching module is further configured to:
merge one or more changes introduced by the modified partial graph of data with the most recent version of the source document based on one or more cache conflict resolution configuration settings when producing a new version of the source document.

15. A non-transitory computer-readable storage medium having control logic recorded thereon that, when executed by a processor, causes the processor to perform operations to detect cache conflicts, the operations comprising:

provising a partial graph of data to an application executing on a mobile device, wherein the partial graph of data is derived from a source document comprising a graph of data having a plurality of nodes;

receiving, from the application executing on the mobile device, a modified partial graph of data, wherein the modified partial graph of data includes one or more changes to the partial graph of data;

generating an information request to a remote enterprise data source to identify (i) a first difference between a version of the partial graph of data locally cached at the middleware device and the received modified partial graph of data, and (ii) a second difference between the partial graph of data locally cached at the middleware device and changes made directly to the source document at the remote enterprise data source by a second mobile device;

merging the first difference and the second difference to generate an updated version of the partial graph of data locally cached at the middleware device; and providing the updated version of the partial graph of data locally cached at the middleware device to the mobile device, the remote enterprise data source, and the second mobile device.

16. The non-transitory computer-readable storage medium of claim 15, the operations further comprising:

receiving information about the source document at the remote enterprise data source based on the information request to the remote enterprise data source;

storing the information in a local cache of the remote enterprise data source; and comparing the information to a delta associated with the modified partial graph of data.

17. The non-transitory computer-readable storage medium of claim 16, the operations further comprising:

automatically merging one or more changes introduced by the modified partial graph with the most recent version of the source document while producing a new version of the source document.

18. The non-transitory computer-readable storage medium of claim 16, the operations further comprising:

merging one or more changes introduced by the modified partial graph with the most recent version of the source document based on at least one instruction received from the mobile application when producing a new version of the source document.

19. The non-transitory computer-readable storage medium of claim 16, the operations further comprising:

sending an alert to the mobile application indicating at least one change introduced by the modified partial graph of data could not be merged with the new version of the source document; and providing the mobile application with the most recent version of the source document.

20. The non-transitory computer-readable storage medium of claim 16, the operations further comprising:

merging one or more changes introduced by the modified partial graph of data with the most recent version of the source document based on one or more cache conflict resolution configuration settings when producing a new version of the source document.

* * * * *